R. KROEDEL.
FORMATION OF AN ARTICLE AND ITS APPLICATION TO ANOTHER ARTICLE.
APPLICATION FILED MAR. 18, 1908. RENEWED MAY 31, 1910.
981,200.
Patented Jan. 10, 1911.
3 SHEETS—SHEET 1.
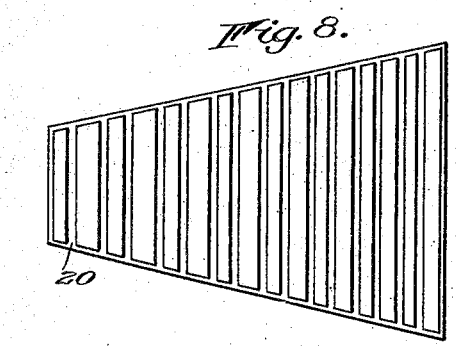
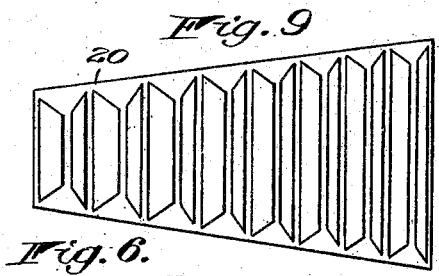
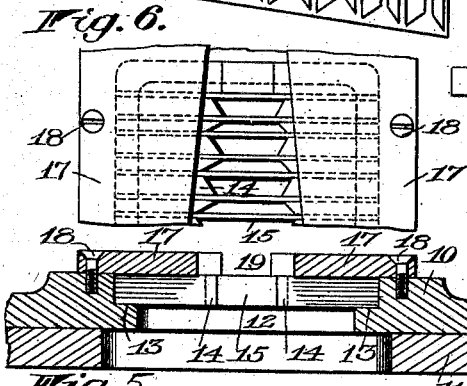
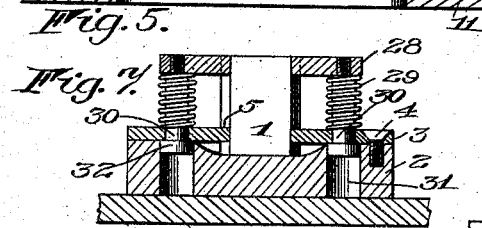
Witnesses
Walter B. Payne
H. H. Simms
Inventor
Robert Kroedel
by Church & Rich
his Attorneys

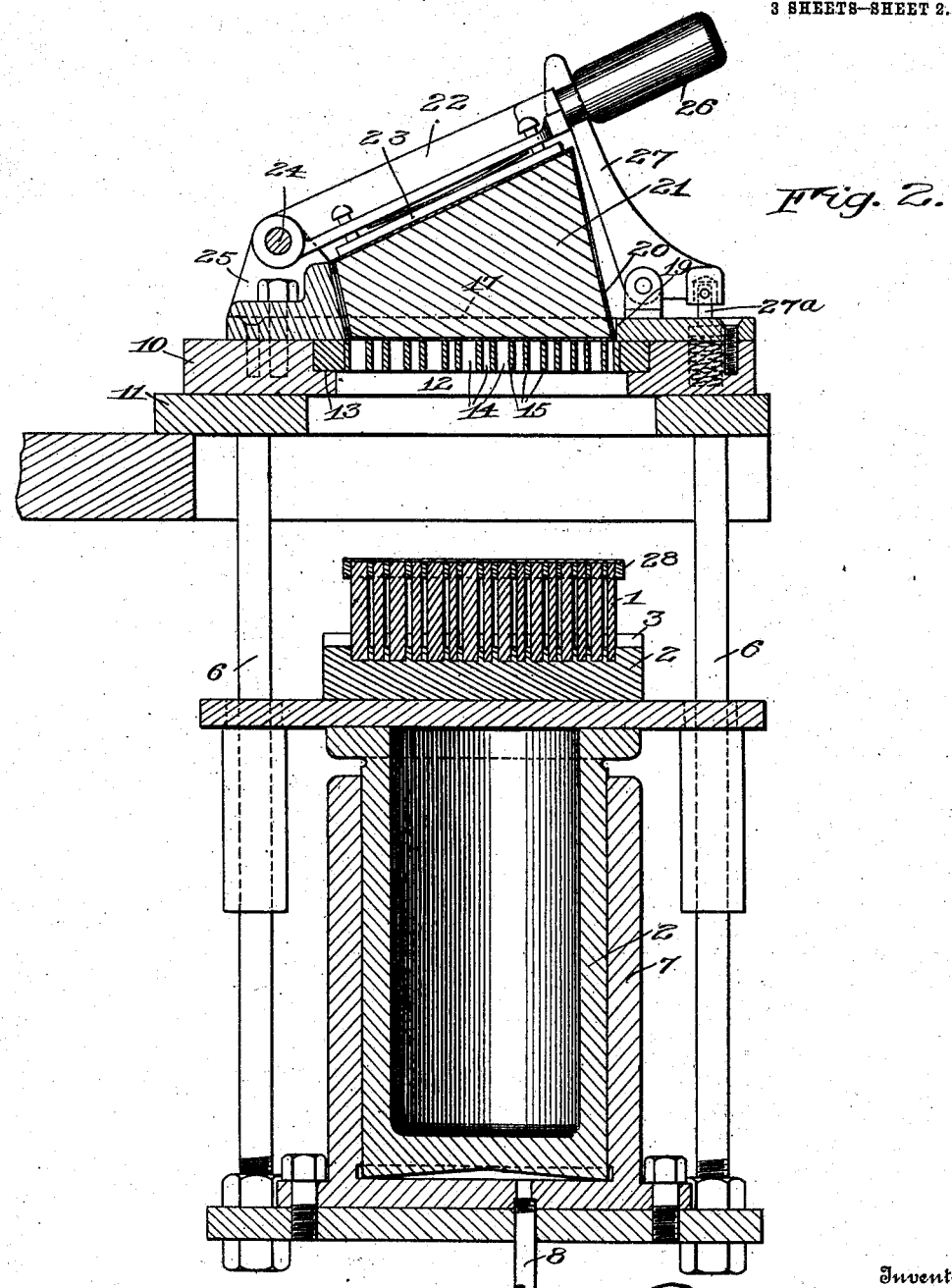

R. KROEDEL.
FORMATION OF AN ARTICLE AND ITS APPLICATION TO ANOTHER ARTICLE.
APPLICATION FILED MAR. 18, 1908. RENEWED MAY 31, 1910.
981,200.
Patented Jan. 10, 1911.
3 SHEETS—SHEET 3.
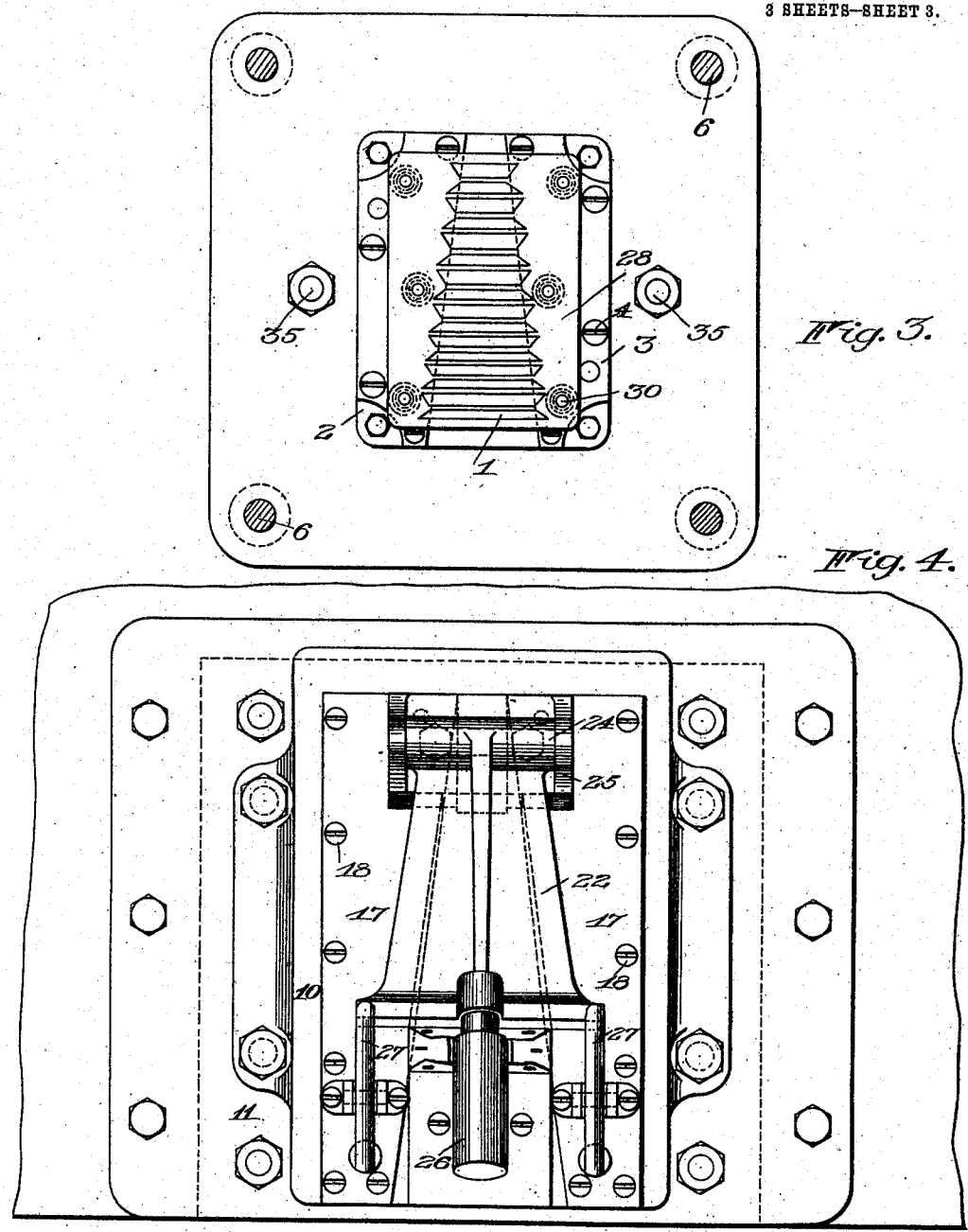

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

FORMATION OF AN ARTICLE AND ITS APPLICATION TO ANOTHER ARTICLE.

981,200.    Specification of Letters Patent.    Patented Jan. 10, 1911.

Application filed March 18, 1908, Serial No. 421,962.  Renewed May 31, 1910. Serial No. 564,139.

*To all whom it may concern:*

Be it known that I, ROBERT KROEDEL, of Rochester, in the county of Monroe and State of New York, have invented certain new and useful Improvements in the Formation of an Article and Its Application to Another Article; and I do hereby declare the following to be a full, clear, and exact description of the same, reference being had to the accompanying drawings, forming a part of this specification, and to the reference-numerals marked thereon.

The present invention which relates to the formation of an article and the application thereof to another article, such for instance as stiffening strips for the bellows for cameras and the like, has for an object to simplify the manufacture of articles of this type and to secure greater accuracy in the positioning of the formed article on the other.

To these and other ends the invention consists in certain improvements and combinations of parts all as will be hereinafter more fully described, the novel features being pointed out in the claims at the end of the specification.

In the drawings: Figure 1 is a front view of a machine for applying stiffening strips to the linings of camera bellows, embodying this invention. Fig. 2 is a vertical cross section of the same machine. Fig. 3 is a top view of a male die which is employed for forming the strips, surrounding portions of the machine being also shown. Fig. 4 is a plan view of the same machine. Fig. 5 is a vertical section through a female die employed in this machine. Fig. 6 is a plan view of a portion of the female die. Fig. 7 is a vertical section through the male die before mentioned; and Figs. 8 and 9 are plan views of two side walls of a camera lining after the stiffening strips are applied.

Bellows manufactured from linings made in accordance with this invention comprise an outer casing, a lining, and stiffening strips spaced apart on all sides between the lining and the casing, the completed article being folded or bent between the strips. If these strips be laid by hand they must be applied one by one and this operation not only consumes a great amount of time, which makes the cost of manufacture expensive, but the bellows when completed, are not neat owing to the inaccurate positioning of the stiffening strips. In the present invention, all the stiffening strips for each side are formed in the relation which they are to have on the lining and are applied directly to the latter from the forming mechanism, so that not only is the time consumed in applying the strips lessened, but greater accuracy is secured.

The forming mechanism in the present instance comprises a male die and a female die, which are relatively movable. The male die is preferably in the form of a plurality of spaced knives 1 arranged parallel to each other and having the form of the strips to be cut, which are illustrated in Figs. 8 and 9, where they are arranged on a lining, and it will be noted that every other strip is narrow as compared with the others and that they gradually decrease in length toward one end of the lining. The knives 1 are secured to a base plunger 2, which for this purpose is provided with seats for the knives. Plates 3 arranged at opposite ends of the knives are secured by fasteners 4 to the plunger and fit recesses 5 in the ends of the knives to hold the latter in their seats. A stripper in the form of a slotted plate 28 fits over the knives 1 and normally lies with its upper face in the plane of the upper faces of the knives. It is supported in this position by springs 29 which surround guide rods 30 that work in ways 31 in the plunger 2, the rods working in openings in plates 3 and being formed with enlargements 32 to engage the under surfaces of the said plates 3 in order to limit the upward movement of the stripper.

The plunger 2 is guided on rods 6 depending from the frame of the machine and works in a fluid cylinder 7 which is suspended by the rods. Fluid admitted through pipe 8 to the cylinder 7 moves the piston and the male die to the female die. The upward movement of the male die is limited by adjustable stops 34 which are carried by rods 35 depending from the plunger 2 and engaging beneath the plate 36 that serves to support cylinder 7. The female die is formed with a plurality of slots 9 corresponding in cross section to that of the male die so as to receive the latter and to permit it to pass therethrough. It is preferably formed by a base plate 10 resting on the frame 11 and having a continuous opening 12 formed therein. On opposite sides of the opening are formed seats 13 for ribs 14 that are provided on the under surface of a pair of plates 17 secured to the top of the base plate 10, by screws 18, the ends of the ribs on the proximate sides of the plates being projected and having their extreme edges forming knives to shape the ends of the strips. Resting at their ends on the seats 13 across the opening in the base plate and between the ribs 14 is a series of knives 15 which form the sides of the strips. The proximate sides of the plates 17 form a pocket or guide 19 to receive the supported lining. A lining 20 fitted about a support 21, is held in the pocket or guide by a holding means comprising in this instance a swinging frame 22 carrying a yieldingly mounted plate 23 to engage the supported lining and pivoted at 24 to brackets 25. At its swinging end the frame carries a handle 26 by which it is operated, and it is engaged by a pair of latches 27 preferably pivoted to the plate 17 and moved in the direction to engage automatically frame 22 when the latter is moved to them, by means of spring pressed plunger 27ª.

In operation the lining 20 is fastened tightly over the support 21 and is then moistened and dropped over the pocket 19 with one side in contact with the upper side of the female die. A sheet of material is laid on stripper plate 28 with its gummed face uppermost and then the plunger 2 is moved to elevate the sheet with the male die. When the latter reaches the female die its knives coöperate with the edges of the walls of the slots and all the strips for one side of the bellows are formed in the relation which they are to hold on the bellows. After the cutting of the strips the female die acts as a guide for the strips to direct them to the lining. Of course, while the strips are being cut, and directed to the lining, the stripper plate yields downwardly because of its engagement with the female die and when the male die is withdrawn, the stripper removes the perforated sheet from the knives. The lining with its support is now turned and its opposite face is presented to the female die to receive strips in the same manner. The other two sides which receive strips like those shown in Fig. 8, have the strips applied in a separate machine with dies formed to correspond therewith.

The machine herein shown is inexpensive to manufacture and its simple operation permits of its being controlled by unskilled labor. The time consumed in the manufacture is reduced very materially and greater neatness and accuracy, with less waste, is secured.

I claim as my invention:

1. The combination with a male and a female die movable relatively to each other, and the former being adapted to pass through the latter, of a removable work support adapted to have a bellows lining fitted thereover and means for holding said support against that face of the female die opposite that on which the male die is arranged.

2. The combination with a male and female die movable relatively to each other, and the former being adapted to pass through the latter, of a swinging frame adapted to hold an article against that face of the female die opposite that on which the male die is arranged, and a device for holding said frame in closed position.

3. The combination with a male and a female die movable relatively to each other, and the former being adapted to pass through the latter, of a swinging frame adapted to hold an article against that face of the female die opposite that on which the male die is arranged, a yieldingly mounted plate carried by the frame to bear against the article, and a device for holding the frame in closed position.

4. The combination with a male and a female die movable relatively to each other, and the former being adapted to pass through the latter, of a swinging frame adapted to hold an article against that face of the die opposite that on which the male die is arranged, and spring pressed latches to hold the frame in closed position.

5. The combination with a male die, of a female die through which the male die is adapted to pass, having a pocket on its side opposite the male die, a removable work support and means for holding said support in said pocket.

6. The combination with a male die, of a female die through which the male die is adapted to pass, comprising a base plate having a continuous opening, plates having ribs on their under sides projecting from opposite sides of the opening, and bars arranged between the ribs and extending across the opening.

7. The combination with a male die, of a female die through which the male die is adapted to pass, comprising a base plate having a continuous opening, bars extending across the opening, and plates secured to the base plate over the bars and forming an opening between them to receive an article.

8. The combination with a female die, of a male die to coöperate therewith comprising a base provided with seats, knives having their sides opposite their cutting edges fitted in said seats and also having recesses in their opposite ends, and a pair of plates secured to the base and fitting in the recesses to hold the knives in their seats.

9. The combination with a male and a female die movable relatively to each other, the former comprising a plurality of parallel knives and the latter being formed with a plurality of parallel slots to receive the knives, of a yieldingly mounted stripper plate surrounding the knives of the male die, and means for holding an article against that face of the female die opposite the side on which the male die is located.

10. The combination of a male and female die movable relatively to each other, the former comprising a head formed with seats and pockets, knives fitted in said seats and formed with recesses in their opposite ends, and plates secured to the head fitting in the recesses and having openings, and the female die being formed with slots through which the knives pass, with a stripper plate surrounding the knives and carrying guides working in the openings in the plates and formed with enlargements working in the pockets of the head and springs surrounding the guides.

11. The combination with a female die, of a removable work support means for holding said work support above the female die and a male die mounted below the female die and adapted to pass through the latter and apply the cut product to an article on the work support.

ROBERT KROEDEL.

Witnesses:
RUSSELL B. GRIFFITH,
H. H. SIMMS.